(No Model.)
J. W. GILBERT.
MOTOR FOR LIGHT MACHINERY.
No. 295,997. Patented Apr. 1, 1884.
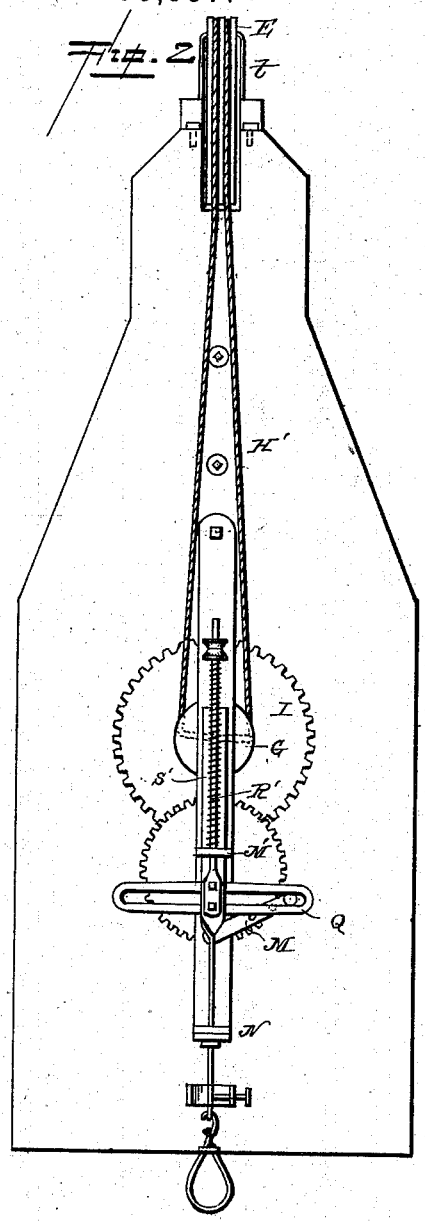
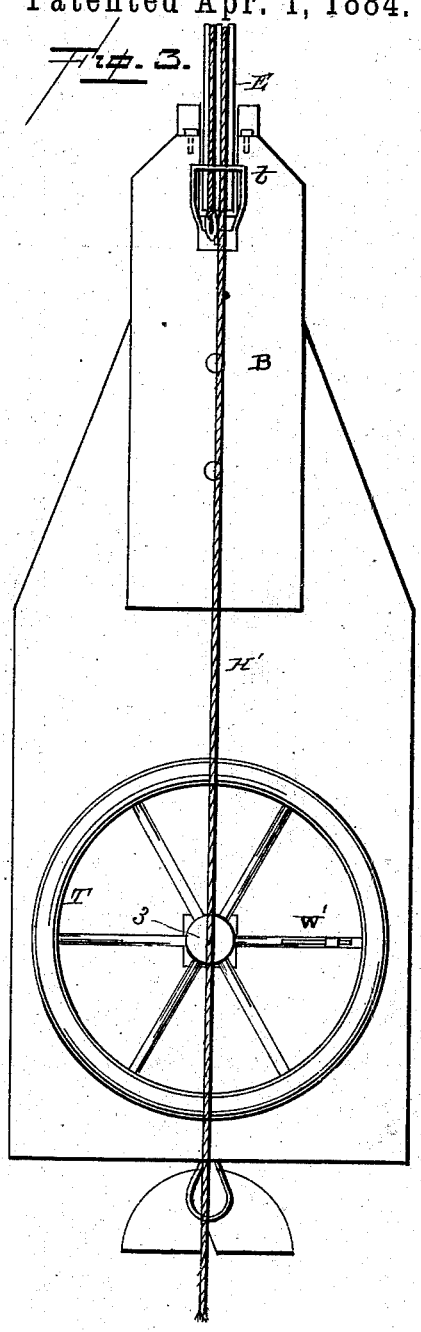
Witnesses.
Louis F. Gardner
J. W. Garner
Inventor.
J. W. Gilbert
per
F. A. Lehmann,
Atty.

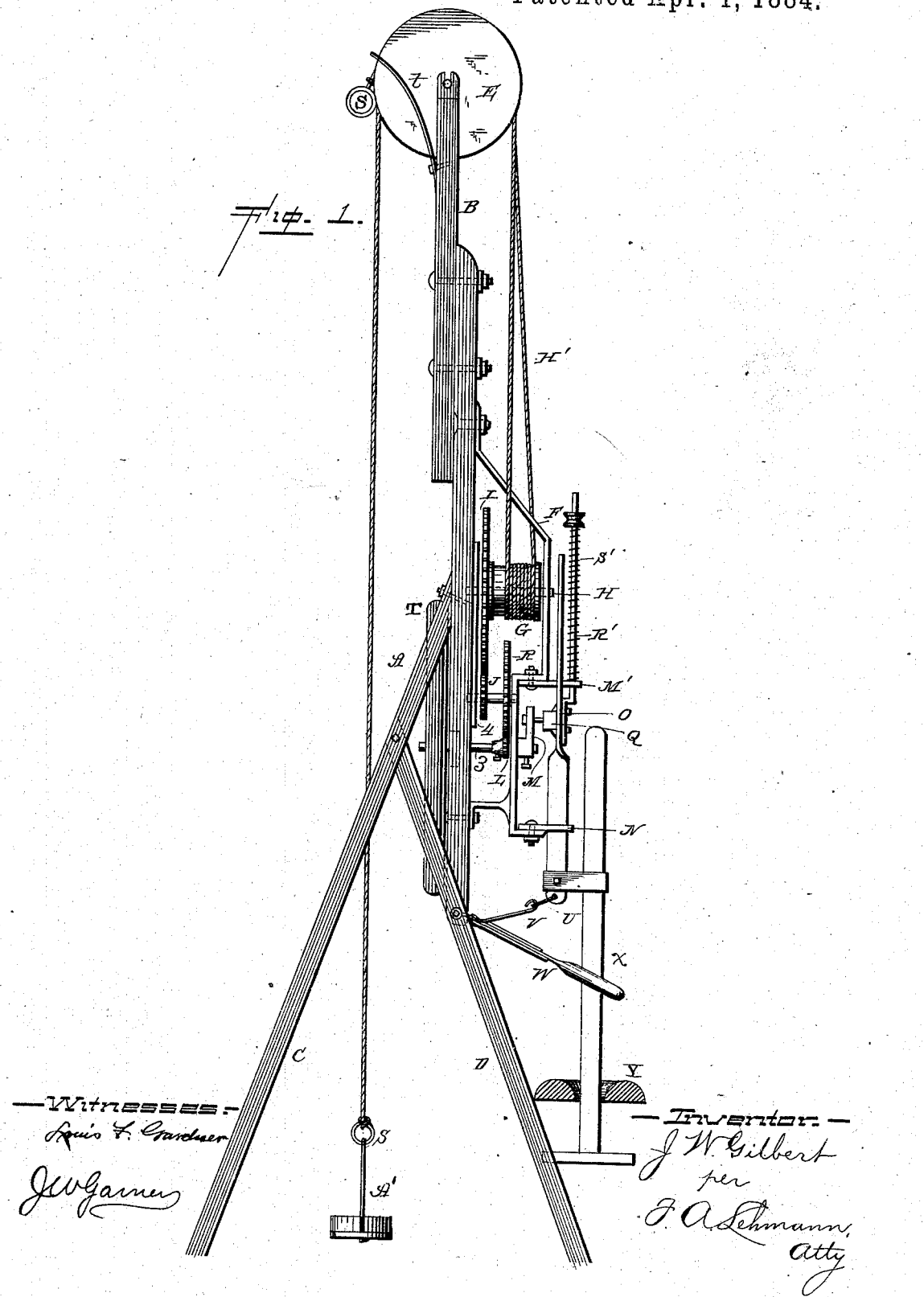

UNITED STATES PATENT OFFICE.

JAMES WILLIAM GILBERT, OF HOBOKEN, ALABAMA.

MOTOR FOR LIGHT MACHINERY.

SPECIFICATION forming part of Letters Patent No. 295,997, dated April 1, 1884.

Application filed December 27, 1882. Renewed December 19, 1883. (No model.)

*To all whom it may concern:*

Be it known that I, J. W. GILBERT, of Hoboken, in the county of Marengo and State of Alabama, have invented certain new and useful Improvements in Motors for Churns and other Light Machinery; and I do hereby declare the following to be a full, clear, and exact description of the invention, such as will enable others skilled in the art to which it pertains to make and use it, reference being had to the accompanying drawings, which form part of this specification.

My invention relates to an improvement in motors for churns and other light machinery; and it consists, first, in the combination of a drum, a cord, wire, or chain, which is wrapped around the drum in such a manner that while one end is being wound upon the drum the other one is being reeled off, a grooved pulley, and suitable weights which are to be attached first to one end of the cord and then to the other, with an operating mechanism which is connected to the drum for the purpose of converting the rotary into a reciprocating motion; second, in the combination, with the operating mechanism, of a fly-wheel, and a check-spring which is applied to the vertically-moving part, for the purpose of producing a regular and even motion, all of which will be more fully described hereinafter.

Figure 1 is an edge view of my invention complete. Figs. 2 and 3 are front and rear elevations of the upper portion of the same.

A represents a suitable frame, to which the operating parts are attached, and which frame is supported upon the two legs C D, which may be secured together and to the frame, either in the manner here shown or in any other that may be preferred. To the upper end of the frame is bolted the extension B, upon the upper end of which are placed suitable bars for the shaft which passes through the double-grooved pulley E. Secured directly to the front of the frame A is a metallic plate, 4, and also secured to this frame by means of suitable clamping-bolts is the metallic frame F, which is preferably shaped as shown in Fig. 1. This frame F and the plate 4 form bearings for the shafts of the train of wheels through which the movement is communicated from the drum G to the vertically-reciprocating rod O. The drum G has a hole made through it, so that the rod H can be passed through; and the ends of the rope are wound upon the drum in opposite directions, so that while one end is being wrapped upon the drum the other end is being reeled off. The cord may be passed through the drum, as shown in dotted lines, so that the ends will wrap in opposite directions. The ends of the cord, wire, or chain H' pass up over the double-grooved pulley E, and have each a ring, S, secured thereto. These cords are held in place upon the pulley by means of the cord-guide *t*, which is secured at its lower end to the extension B. This guide consists of a perforated plate, as in Fig. 3, and which is bent in such a manner as to pass over the sides of the pulley and prevent the ends of the cords from becoming displaced.

Secured to the same shaft as the drum G is the spur-wheel I, which meshes with the pinion J, which is placed upon the same shaft as the wheel R, which in turn meshes with the pinion L on the same shaft 3, to which are secured the fly-wheel T and the crank M. The crank M has a series of holes made through it, as shown in Fig. 2, so that the wrist-pin can be changed from one hole to the other, and thus cause a longer or shorter stroke to be given.

Secured to the frame F is the guide N, through which the vertically-reciprocating rod O is made to pass, and this rod is twisted at or near its center, as shown, and just above the twist is secured the slotted plate Q, in which the wrist-pin catches for the purpose of moving the rod up and down. Also, secured to this slotted plate, and passed up through the upper guide, M', is the rod R', upon which the check-spring S' is placed. Upon the upper end of the rod R' is placed a suitable regulating nut or nuts, by means of which the tension of the spring can be increased or diminished at will. As the lower end of this spring S' bears upon the guide M', and as the rod R' is secured directly to the vertically-reciprocating rod O, it will be seen that at each downward movement of the rod O the spring serves to check the movement and to assist in raising the rod upward, and this spring, in connection with the fly-wheel T, produces an even and regular motion.

Pivoted to the lower end of the frame A is the fan W, and this fan is connected to the rod O by means of the wires V U. This fan is made to reciprocate upon the dasher-rod X, for the purpose of keeping away flies which gather upon the top of the churn, and to fan any person who may be sitting near. The dasher-rod X is secured to the lower end of the rod or plate O by means of any suitable devices. Upon the dasher-rod will be placed a weight, Y, so as to hold the top of the churn down in position, and to prevent it from becoming displaced by the dasher-rod while in operation.

In order to equalize the weight of the dasher, a weight, W', is secured to one of the arms of the fly-wheel T in any suitable manner, and which weight may be adjusted back and forth upon the arm, for the purpose of adjusting it to the weight of the dasher. This weight, counterbalancing the weight of the dasher, serves to assist the wheel T around, and thus give a much more regular and even movement to the different parts than can be done where the dasher is left unbalanced.

When the churn is adjusted to the machine ready for use, a number of weights, proportionate to the amount of work to be done, is placed upon a hook, A', and then this hook is hung in the ring S, which is attached to the end of the cord H', which is raised highest from the floor. These weights cause the drum G to revolve and operate the churn or other light machine which is attached to the frame. When the weights have reached the floor, it is only necessary to detach the hook from that end of the cord and attach it to the other, when the machine will continue its motion. By this construction it will be seen that there is no necessity for winding any part up, for it is only necessary to change the hook from one end of the cord H' to the other end from time to time, as may be necessary.

I do not limit myself to any details of construction, as here shown, for the parts may be bolted or secured together by means of set-screws, or any other way that may be preferred.

Having thus described my invention, I claim—

1. In a motor, the combination of the pulley, the cords passing over it, and a perforated spring-holder, t, which catches over the pulley and prevents displacement of the cord, substantially as shown.

2. The combination of the reciprocating rod O, to which the churn-dasher is connected, with the slotted plate Q, the guide N, the rod R', and spring S', substantially as set forth.

3. The combination, in a motor for churns and other light machines, of a fly-wheel provided with a weight upon one of its arms, the slotted plate, the rod O, the rod R', spring S', and guides N M, the parts being combined and arranged to operate as shown and described.

4. The combination of the vertically-moving rod O and a suitable guide with the fan W and its connections U V and the dasher-rod, substantially as specified.

In testimony whereof I affix my signature in presence of two witnesses.

JAMES WILLIAM GILBERT.

Witnesses:
G. F. NICHOLS,
JAS. E. NICHOLS.